US008064712B2

(12) United States Patent
Wheeler et al.

(10) Patent No.: US 8,064,712 B2
(45) Date of Patent: Nov. 22, 2011

(54) SYSTEM AND METHOD FOR RECONSTRUCTING RESTORED FACIAL IMAGES FROM VIDEO

(75) Inventors: Frederick Wilson Wheeler, Niskayuna, NY (US); Xiaoming Liu, Schenectady, NY (US); Peter Henry Tu, Niskayuna, NY (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1107 days.

(21) Appl. No.: 11/836,316

(22) Filed: Aug. 9, 2007

(65) Prior Publication Data

US 2008/0175509 A1   Jul. 24, 2008

Related U.S. Application Data

(60) Provisional application No. 60/886,433, filed on Jan. 24, 2007.

(51) Int. Cl.
*G06K 9/40*  (2006.01)
(52) U.S. Cl. .............................. 382/254; 382/260
(58) Field of Classification Search .................. 382/254, 382/260, 285, 286, 294, 100, 118, 154; 345/419, 345/420, 581
See application file for complete search history.

(56) References Cited

U.S. PATENT DOCUMENTS 7,756,325 B2 * 7/2010 Vetter et al. .................. 382/154

OTHER PUBLICATIONS

Farsiu et al., "Fast and Robust Multiframe Super Resolution", IEEE Transactions on Image Processing, IEEE Service Center, Piscataway, NJ, USA, vol. 13, No. 10, pp. 1327-1344, Oct. 2004.
Lin et al., "Face Recognition From Super-Resolved Images", Signal Processing and Its Applications, 2005. Proceedings of the Eighth International Symposium, Sydney, Australia, pp. 667-670, Aug. 28-31, 2005.
Wheeler et al., "Multi-Fram Image Restoration for Face Recognition", IEEE Workshop on Signal Processing Applicatons for Public Security and Forensics, pp. 1-6, Apr. 13, 2007.
European Search Report dated May 19, 2008.
Blackburn et al., "Facial Recognition Vendor Test 2000 Evaluation Report", pp. 36-39, Feb. 2001.
Chaudhuri, "Super-Resolution Imaging", Kluwer Academic Publishers, 3rd Edition, 8 pages, 2001.
Kang et al., "Super-Resolution Image Reconstruction", IEEE Signal Processing Magazine, Special Edition, vol. 20, No. 3, pp. 19-20, May 2003.
Borman et al., "Topics in Multiframe Superresolution Restoration", University of Notre Dame, Notre Dame, Indiana, 2 pages, Apr. 2004.

(Continued)

*Primary Examiner* — Yon Couso
(74) *Attorney, Agent, or Firm* — Kinney & Lange, P.A.

(57) ABSTRACT

A system and method for performing a facial image restoration is described. The system includes an active appearance model component for fitting an active appearance model to a facial image found in each of a plurality of video frames, a registration component for registering each pixel of each facial image with comparable pixels of each of the other facial images, and a restoration component for producing a restored facial image from the facial images. The method includes fitting an active appearance model to a facial image found in each of a plurality of video frames, registering each pixel of each said facial image with comparable pixels of each of the other facial images, and producing a restored facial image from the facial images.

18 Claims, 4 Drawing Sheets

OTHER PUBLICATIONS

Liu et al., "Face Model Fitting on Low Resolution Images", in Proc. of the British Machine Vision Conference (BMVC), Edinburgh, United Kingdom, 10 pages, 2006.

Cootes et al., "A Trainable Method of Parametric Shape Description", in Proc. 2nd British Machine Vision Conference (BMVC), pp. 54-61, Springer, Sep. 1991.

Baker et al., Lucas-Kanade 20 Years On: A Unifying Framework, International Journal of Computer Vision, vol. 56, pp. 221-255, Mar. 2004.

Farsiu et al., "Fast and Robust Multiframe Super Resolution", IEEE Transactions on Image Processing, vol. 13, No. 10, pp. 1327-1344, Oct. 2004.

Schneiderman, "Learning a Restricted Bayesian Network for Object Detection", in Proceedings of the IEEE Computer Society Conference on Computer Vision and Pattern Recognition (CVPR'04), 8 pages, 2004.

Schneiderman, "Feature-Centric Evaluation for Efficient Cascaded Object Detection", in Proceedings of the IEEE Computer Society Conference on Computer Vision and Pattern Recognition (CVPR'04), 8 pages, 2004.

Hartley et al, "Projective Geometry and Transformations of 2D", Multiple View Geometry in Computer Vision, Cambridge University Press., pp. 3-22, 2000.

Baker et al., "Limits on Super-Resolution and How to Break Them", IEEE Transactions on Pattern Analysis and Machine Intelligence, vol. 24, No. 9, pp. 1167-1183, Sep. 2002.

Baker et al., "Super-Resolution Optical Flow", Tech. Rep. CMU-RI-TR-99-36, Robotics Institute, Carnegie Mellon University, Pittsburgh, PA, pp. Abstract and 1-13, Oct. 1999.

Park et al., "Locality Preserving Projections as a New Manifold Analysis Approach for Robust Face Super-Resolution", Proc. of SPIE, vol. 6539, Biometric Technology for Human Identification IV, pp. 65390H-1-65390H-8, 2006.

Stephenson et al., "Adaptive Markov Random Fields for Example-Based Super-Resolution of Faces", EURASIP Journal on Applied Signal Processing, vol. 2006, Article ID 31062, pp. 1-11, 2006.

Yao et al., "Super-Resolution for High Magnification Face Images", Proc. of SPIE, vol. 6539, pp. 65390G-1-65390G-10, 2006.

Wheeler et al., "Multi-Frame Super-Resolution for Face Recognition", in Proc. of IEEE Signal Processing Society: Workshop on Signal Processing Applications for Public Security and Forensics (SAFE), Washington, DC, 6 pages, Apr. 2007.

Chang et al., "Face Recognition Using 2D and 3D Facial Data", in ACM Workshop on Multimodal User Authentication, pp. 25-32, Dec. 2003.

Flynn et al., "Assessment of Time Dependency in Face Recognition: An Initial Study", in Audio and Video-Based Biometric Person Authentication, pp. 44-51, 2003.

Phillips et al., "The FERET Evaluation Methodology for Face-Recognition Algorithms", IEEE Transactions on Pattern Analysis and Machine Intelligence, vol. 22, No. 10, pp. 1090-1104, Oct. 2000.

\* cited by examiner

SYSTEM AND METHOD FOR RECONSTRUCTING RESTORED FACIAL IMAGES FROM VIDEO

CROSS-REFERENCE TO RELATED APPLICATIONS

The present patent application claims priority from provisional patent application Ser. No. 60/886,433, filed Jan. 24, 2007, the disclosure of which is hereby incorporated by reference in its entirety.

STATEMENT REGARDING GOVERNMENT INTERESTS

This invention was made with Government support under Contract No. 2005-IJ-CX-K060-GOVT awarded by the National Institute of Justice. The Government has certain rights in the invention.

BACKGROUND

The invention relates generally to a system and method for fitting an active appearance model to a face in frames of a video, registering each of the faces, and producing a restored facial image using the frames of the video.

Automatic facial recognition at a distance is becoming of greater importance in many real-world scenarios, such as, for example, law enforcement surveillance applications. Automatic facial recognition at a distance, however, has had some challenging aspects. Low image resolution and camera blur contribute to the inability in many instances to obtain accurate facial recognition.

In many surveillance systems, in which it is desirable to incorporate automatic face recognition, the subject is captured on videos. Known facial recognition algorithms work on still images, so facial recognition applications generally extract a single frame of the video with a suitable view of the face. In a sense, the known facial recognition applications use only a small portion of the information available in the video.

SUMMARY

The present invention describes a system and a method that uses multiple frames of a video to produce restored facial images. The term "restored" is used herein to denote that the resulting facial image has greater clarity than any individual facial image from any of the multiple video frames.

One exemplary embodiment of the invention is a system for producing restored facial images from frames of a video. The system includes an active appearance model component for fitting an active appearance model to a facial image found in each of a plurality of video frames. The system also includes a registration component for registering each pixel of each said facial image with comparable pixels of each of the other facial images, and a restoration component for producing a restored facial image from the facial images.

Another exemplary embodiment of the invention is a method for producing restored facial images from frames of a video. The method includes fitting an active appearance model to a facial image found in each of a plurality of video frames, registering each pixel of each facial image with comparable pixels of each of the other facial images, and producing a restored facial image from the facial images.

These and other advantages and features will be more readily understood from the following detailed description of preferred embodiments of the invention that is provided in connection with the accompanying drawings.

DETAILED DESCRIPTION OF EXEMPLARY EMBODIMENTS

Figure 1:
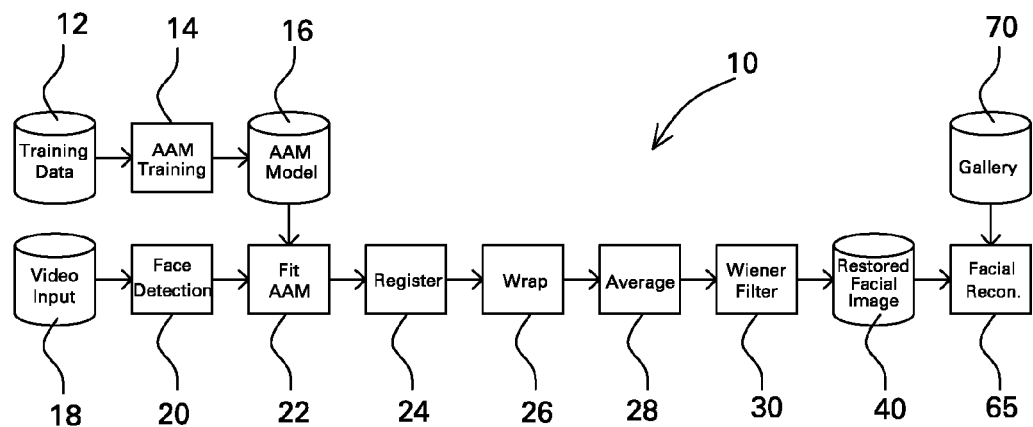
FIG. 1 is a schematic view illustrative of a high-quality facial restoration system in accordance with an exemplary embodiment of the invention.

Embodiments of the invention, as described and illustrated herein, are directed to a system and a methodology that uses multiple frames of a video to produce restored facial images. With specific reference to FIG. 1, there is shown a facial reconstruction system 10. The system 10 includes a training database 12, a video input 18, an active appearance model within module 16, a registration module 24, a warping module 26, an averaging module 28, and a Wiener filter module 30.

The training database 12 includes two-dimensional and possibly three-dimensional facial images. The training database 12 is used to train an active appearance model ("AAM"). The training database 12 may be a publicly available one, such as, for example, the Notre Dame Biometrics Database Collection D ("Collection D"). The facial images from the training database 12 are used by an active appearance model training module 14 to construct a mathematical representation of the appearance and shape of the facial images in general. By "appearance" is meant the colorization and texture. This mathematical representation may be adjustable.

The first step in multi-frame restoration is registration. To combine frames, each frame must be mapped such that between a pair of frames $x_2$ is a function of $x_1$. This allows for conversion of the first image coordinates, $x_1=(r_2, c_2)$, of a real object or scene point to the second image coordinates, $x_2=(r_2, c_2)$. One approach to registration is to select a parameterized registration function that can accurately model the actual frame-to-frame motion, such as an AAM.

Figure 2:
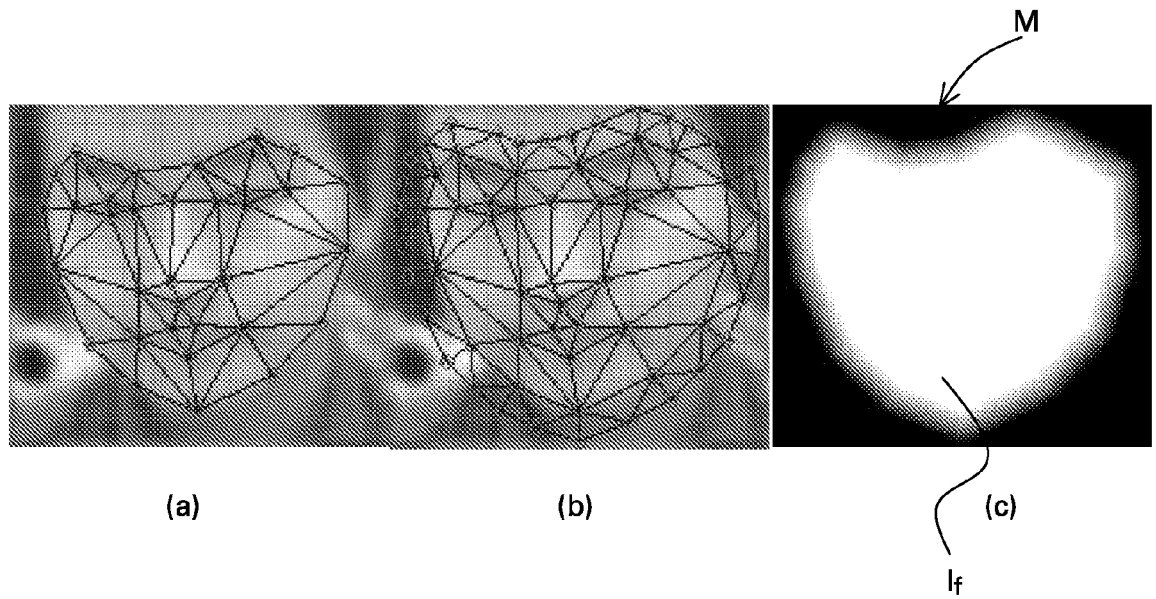
FIGS. 2(a) through 2(c) illustrate the use of landmark points in the active appearance model of the system of FIG. 1.

An AAM applied to facial images is a two-stage model of both facial shape and appearance designed to fit the faces of different persons at different orientations. The active shape sub-model describes the distribution of the locations of a set of landmark points. FIG. 2(a) show 33 landmark points that will be used in the registration of a series of facial images. Principle Components Analysis (PCA) and the training set of facial images are used to reduce the dimensionality of the shape space while capturing major modes of variation across the training set population.

The AAM active shape sub-model includes a mean face shape that is the average of all the facial shapes in the training set from the database 12 and a set of eigenvectors. The mean face shape is the canonical shape and is used as the frame of reference for an AAM active appearance sub-model. Each training set of facial images is warped to the canonical shape frame of reference.

Since each training set of facial images are warped to the canonical shape frame of reference, all of the facial images from the training set are presented as if they have the same shape. With shape variation removed, the variation in appearance of the facial images is modeled in the second stage, using PCA to select a set of appearance eigenvectors for dimensionality reduction.

The completely trained active appearance model of module 16 can produce facial images that vary continuously over appearance and shape. For the purpose of restoring facial images, the active appearance model of module 16 is fit to a new face as it appears in one of the video frames. This is accomplished by solving for the face shape and appearance parameters (eigen-coefficients) such that the model-generated face matches the face in the video frame. A Simultaneous Inverse Compositional (SIC) algorithm may, for example, be used to fit the new face to the one within the video frames.

Video input 18, which may include one or more video cameras or one or more still cameras set to automatically take a series of still photographs, obtain multiple frames of video (or still photographs), each to include a facial image of a subject. It should be appreciated that the video input 18 may be live or forensic video or still photographs. If the video or still photographs are analog-based, an analog-to-digital converter would be required prior to transmitting the frames. The output frames of the video input 18 are transmitted to a face detection module 20, which is used to detect the facial image. The detection may be done automatically or manually. An example of manual detection may include the use of a Graphical User Interface. An example of automatic detection may include a facial detection software package marketed by Pittsburgh Pattern Recognition of Pittsburgh, Pa.

For each frame and each detected face, a vector of shape parameters and a vector of appearance parameters are obtained. The AAM of module 16 receives the eigenvectors of facial shape and appearance from the active appearance model training module 14. Further, an AAM fitting module 22 determines the vectors of shape parameters and of appearance parameters. The vector of shape parameters control the shape of the face, while the vector of appearance parameters control the appearance of the face.

While shape parameters and appearance parameters must be estimated to fit the model to a new face, only the resulting shape parameters are used for registration. The AAM of module 16 provides the registration needed to align the face across the multiple video or still frames. The active shape sub-model portion of the AAM defines the 33 landmark positions in each frame (FIG. 2(a)). These landmark positions are the vertices of 49 triangles over the face shown.

The registration, accomplished by the registration module 22, of the face between any two frames may become a piecewise affine transformation or a spline transformation, with an affine transformation for each of the triangles defined by the corresponding triangle vertices. To avoid a discontinuity close to the edge of the faces, the registration of the face is augmented by extrapolating the set of facial landmarks to define an extended border region (FIG. 2(b)). As shown, 30 new landmarks have been positioned a fixed distance out from the estimated facial edges, forming 45 new triangles at the border. A blending mask (FIG. 2(c)) is used to combine the facial region of the multi-frame facial reconstructions with the non-facial (background) region of a single observed frame, thus provided a more natural, blended result for a viewer. The blending mask M is defined in a base frame that has a value of 1 inside the face region and fades to zero outside of that region linearly with distance to the face region. The blending mask M is used to blend a restored facial image $I_R$ with a fill image $I_f$ using:

$$I(r,c)=M(r,c)I_R(r,c)+(1-M(R,c))I_f(R,c).$$

During the registration function, one of the multiple video (or still photographic) frames is chosen as a base frame $L_k$. Since motion is occurring between the various frames, and the motion is generally fluid in a particular direction, a frame from the middle of all the frames $L_1$ to $L_N$ may be chosen as the base frame $L_k$. A new frame of reference $H_k$ is created from that base frame $L_k$. The new frame of reference $H_k$ has a greater pixel resolution than the base frame $L_k$.

Figure 3:
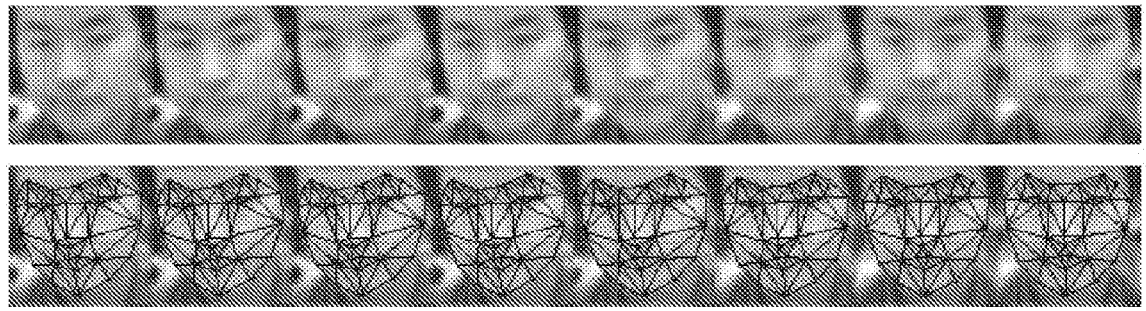
FIG. 3 illustrates the use of consecutive video frames and the use of landmark points in the active appearance model of the system of FIG. 1.

FIG. 3 illustrates registration of facial images in a series of video frames. Once a series of two or more video frames is registered, warping of the facial images is accomplished through the warping module 26. Registration information obtained from the active appearance model fitting module 22 is then used to warp each of the facial images of each of the input video (or still photographic) frames $L_1$-$L_N$ to the new frame of reference $H_k$.

The output from the warping module 26 is input to the averaging module 28, which averages all the warped video (or still photographic) frames. The averaging may be done by adding up, on a pixel-by-pixel basis, and dividing by the number of frames.

The output from the averaging module 28 is then input to the Wiener filter 30. The video frames that are initially input are formed by the imaging process from a continuous image of a scene that has been convolved with a Point Spread Function (PSF), sampled on an image grid, corrupted by additive white Gaussian noise, and quantized. The PSF is responsible for blur that needs to be reduced. The additive noise limits the ability to reduce the blur. A dominant source of noise is CCD electronic noise, which is well modeled as additive Gaussian with a flat spectrum.

With all image signals represented in the spatial frequency domain, if the transform original image is $I(\omega_1, \omega_2)$, the Optical Transfer Function (OTF, the Fourier Transform of the PSF) is $H(\omega_1, \omega_2)$ and the additive Gaussian noise signal is $N(\omega_1, \omega_2)$, then the observed video frame is:

$$G(\omega_1,\omega_2)=H(\omega_1,\omega_2)I(\omega_1,\omega_2)+N(\omega_1,\omega_2).$$

The Wiener filter 30 is a classic method for single image deblurring. It provides a Minimum Mean Squared Error (MMSE) estimate of $I(\omega_1, \omega_2)$. With a non-blurred image given a noisy blurred observation $G(\omega_1, \omega_2)$, and with no assumption made about the unknown image signal, the Wiener filter 30 is:

$$I(\omega_1,\omega_2)=(H^*(\omega_1,\omega_2))G(\omega_1,\omega_2)/|(H(\omega_1,\omega_2)|^2+K).$$

The parameter $H^*(\omega_1, \omega_2)$ is the complex conjugate of $H(\omega_1, \omega_2)$, and the parameter K is the noise-to-signal power ratio, thus forming the MMSE Wiener filter. In practice, the parameter K is adjusted to balance noise amplification and sharpening. If parameter K is too large, the image fails to have its high spatial frequencies restored to the fullest extent possible. If parameter K is too small, the restored image is corrupted by amplified high spatial frequency noise. As K tends toward zero, and assuming $H(\omega_1, \omega_2)>0$, the Wiener filter approaches an ideal inverse filter, which greatly amplifies high-frequency noise:

$$I(\omega_1,\omega_2)=G(\omega_1,\omega_2)/(H(\omega_1,\omega_2)).$$

The effect of the Wiener filter 30 on a blurred noisy image is to (1) pass spatial frequencies that are not attenuated by the PSF and that have a high signal-to-noise ratio; (2) amplify spatial frequencies that are attenuated by the PSF and that have a high signal-to-noise ratio; and (3) to attenuate spatial frequencies that have a low signal-to-noise ratio.

The baseline multi-frame restoration algorithm works by averaging the aligned face region of consecutive video frames $L_1$ to $L_N$ and applying a Wiener filter to the result. The frame averaging reduces additive image noise and the Wiener filter deblurs the effect of the PSF. The Wiener filter applied to a time averaged frame can reproduce the image at high spatial frequencies that were attenuated by the PSF more accurately than a Wiener filter applied to a single video frame. By reproducing the high spatial frequencies more accurately, the restored facial image 40 will have higher effective resolution and greater clarity in detail. This is due to image noise at these high spatial frequencies being reduced through the averaging process. Each of N measurements corrupted by zero-mean additive Gaussian noise with a variance $\sigma^2$ gives an estimate of that value that has a variance of $\sigma^2/N$. Averaging N registered and warped images reduces the additive noise variance and the appropriate value of K by a factor of 1/N.

Figure 4:
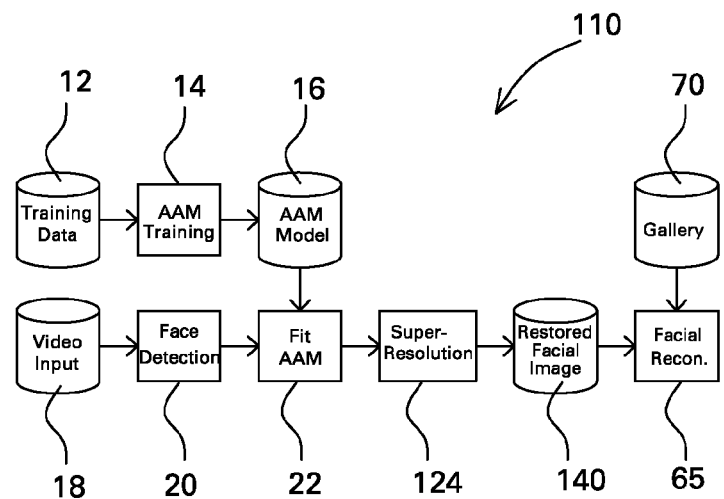
FIG. 4 is illustrative of a high-quality facial restoration system in accordance with another exemplary embodiment of the invention.

Referring now specifically to FIG. 4, there is shown a facial reconstruction system 110. The system 110, like the system 10 (FIG. 1), includes a training database 12, video input 18, and an active appearance model within module 16, and each of these components operate similarly as in the system 10 described above. The system 110 further includes a super-resolution module 124 for producing a restored facial image 140.

In operation, the system 110 fits an active appearance model to a facial image in each frame. A set of a plurality of frames, for example, about N=10 consecutive frames, are then combined to produce a super-resolved image 140. In one possible embodiment, the image formation process, which includes face motion, camera PSF and sampling, is modeled for each frame. To solve for the super-resolved image 140, a cost function with an $L_1$-norm data fidelity component is defined and a Bilateral Total Variation regularization is used. A steepest descent search, using an analytic gradient of the cost function, yields the super-resolved facial image 140.

Super-resolution of the facial images into a restored facial image 140 is accomplished through an appropriate super-resolution algorithm 124, such as one similar to the one suggested by Farsiu et al. in "Fast and robust multiframe super-resolution," IEEE Transactions on Image Processing, vol. 13, no. 10, pp. 1327-1344, October 2004.

Each of the N input frames, $Y_i$ (where i is 1 through N) exists in a low-resolution frame of reference denoted $L_i$. Such a frame of reference encapsulates the image size and active appearance model landmark points. A registration process allows us to warp images between frames of reference. For each $L_i$, a corresponding high-resolution frame of reference $H_i$, having greater pixel resolution than $L_i$ in each dimension, is created. The super-resolution image 140 is solved for in the frame $H_k$, where k=N/2.

Figure 5:
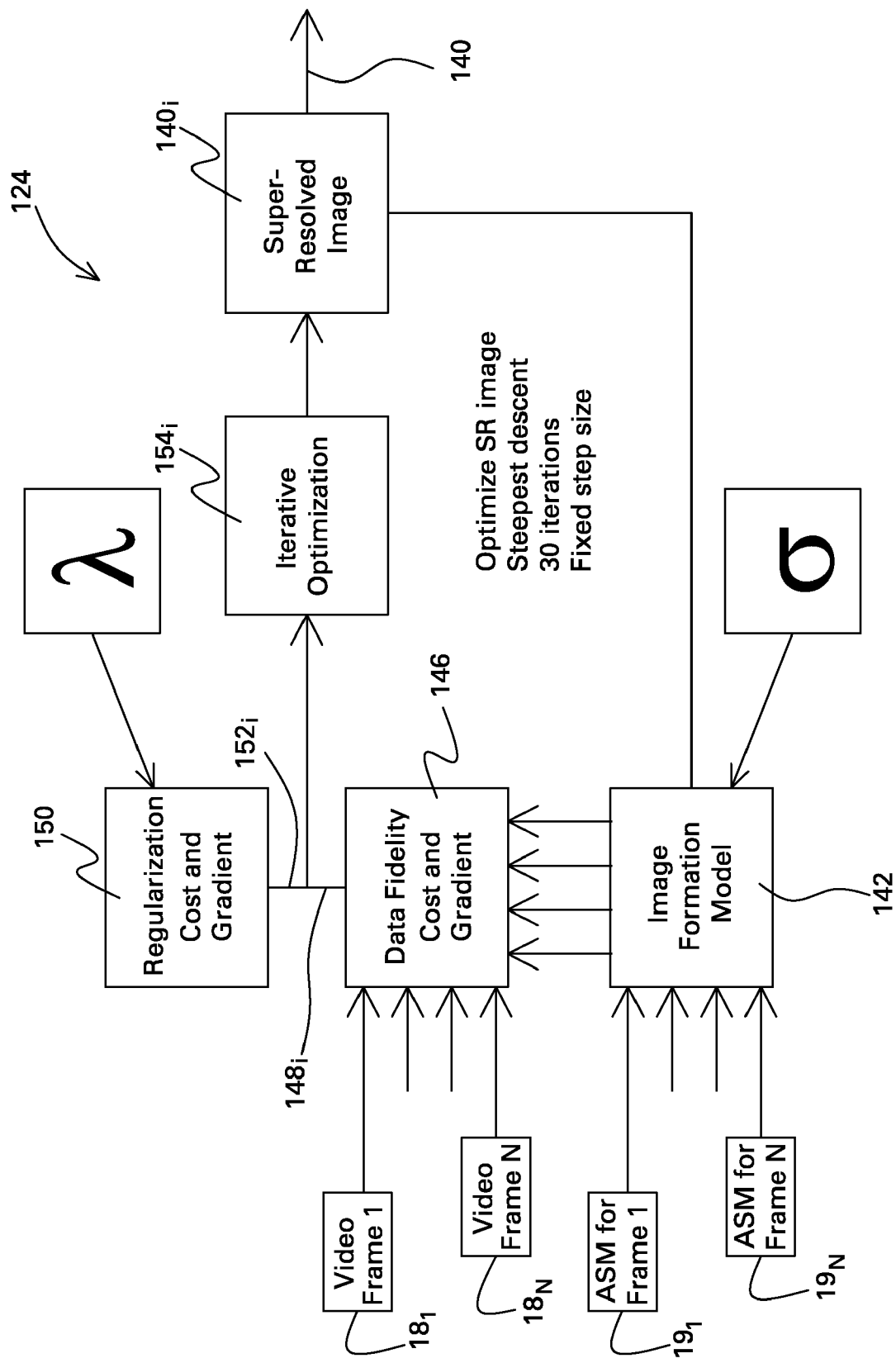
FIG. 5 is a schematic view of an exemplary super-resolution algorithm for use in the system of FIG. 4.

To initialize the super-resolution algorithm 124, the initial super-resolved image $140_i$ is created by warping the face region of each of the N input frames $Y_i$ to the frame $H_k$ and averaging. The warping scales up and aligns each facial image. The result is blended with the non-facial regions of the input image $Y_k$ scaled up to frame $H_k$. The super-resolution process uses an image formation model relating each of the input frames $Y_i$ to an unknown super-resolution image, X, in frame $H_k$. With specific reference to FIG. 5, an initial super-resolved image of a set of iteratively improved super-resolved images $140_1$ to $140_N$, shown generally as $140_i$, is transmitted to an image formation model 142. The image formation model 142 accounts for face motion, camera blur, and detector sampling as it relates X to each $Y_i$. Specifically, the appearance shape models 19 for each of the multiple frames 1 to N, shown generally as ASM $19_1$ to ASM $19_N$, are input to the image formation model 142, along with the camera blur, and the initial super-resolved image $140_i$.

For each input frame $19_i$, the registration operator $F_i$ warps X from frame $H_k$ to frame $H_i$, which has twice the resolution of $L_i$ but is aligned with $Y_i$. Nearest-neighbor, bilinear, or any other interpolation may be used for the warping operation. The camera blur operator, H, is not dependent on variable i and applies the PSF within a high-resolution frame $H_i$. Most installed surveillance cameras are challenged by determining a true PSF. The image formation model 142 assumes a Gaussian shaped PSF with hand selected width, $\sigma$. The sampling operation of the detector is represented by the sparse matrix D that extracts every other pixel in each dimension, converting from frame $H_i$ to $L_i$, the frame of reference for the input frame $Y_i$. If $V_i$ represents additive pixel intensity noise, the complete linear image formation process is then:

$$Y_i = DHF_iX + V_i.$$

The output $Y_i$ is then input to the Data Fidelity module 146, which determines the data fidelity cost and the gradient of this cost with respect to the super-resolved image pixel values. The data fidelity cost $J_{DF}(X)$, as defined below, is the $L_1$ norm of the difference between the model of the observations and the actual observations, plus a regularization term $\Psi(X)$. One optimizing algorithm that may be used for determining the super-resolved image X is:

$$J_{DF}^n(x) = \sum_{i=1}^{n} \|DHF_iX - Y_i\|.$$

The $L_1$ norm is used in the Data Fidelity module 146 for robustness against incorrect modeling assumptions and registration errors.

Concurrently, the initial super-resolved image $140_i$ is transmitted to a regularization module 150, which uses a Bilateral Total Variation (BTV) for inhibiting a solution tending toward degenerate super-resolved images. The BTV cost function is:

$$\Psi(X) = \sum_{l=-P}^{P} \sum_{m=-P}^{P} \alpha^{|m|+|l|} \|X - S_x^l S_y^m X\|_1.$$

Here, $S_x^l$ and $S_y^m$ are operators that shift the image in the x and y direction by l and m pixels. With BTV, the neighborhood over which absolute pixel difference constraints are applied can be larger, with P>1, than for Total Variation (TV). The size of the neighborhood is controlled by parameter P and the constraint strength decay is controlled by $\alpha$ ($0<\alpha<1$).

To solve for the super-resolution image 140, X is first initialized to the initial image $140_1$ as described above. The initial image $140_1$ is transmitted to the image formation module 142 and the regularization module 150. The image formation module 142 outputs a result to the Data Fidelity module 146. The Data Fidelity module 146 outputs an analytic gradient of the data fidelity cost function $148_i$, and the regularization module 150 outputs an analytic gradient of the regularization cost function $152_i$. These outputs $148_i$, $152_i$ are input to the iterative optimization module $154_i$. A steepest descent search using a step size β=0.01 and a fixed number of iterations, such as, for example, 30 iterations, is used:

$$X_{n+1} = X_n - B\left\{\sum_{i=1}^{n} F_i^T H^T D^T \; \text{sign}(DHF_i X_n - Y_i) + \right.$$

$$\left. \lambda \sum_{l=-P}^{P} \sum_{m=-P}^{P} \alpha^{|m|+|l|}(I - S_y^{-m} S_x^{-l})\text{sign}(X_n - S_x^l S_y^m X_n)\right\}.$$

When the observed video is color, the super-resolution processing is applied to the luminance component only. The initial image is converted to the NTSC color space (YIQ), and the luminance (Y) component is computed for all input frames. The super-resolved luminance result is combined with the chrominance components from the initial image.

Figure 6:
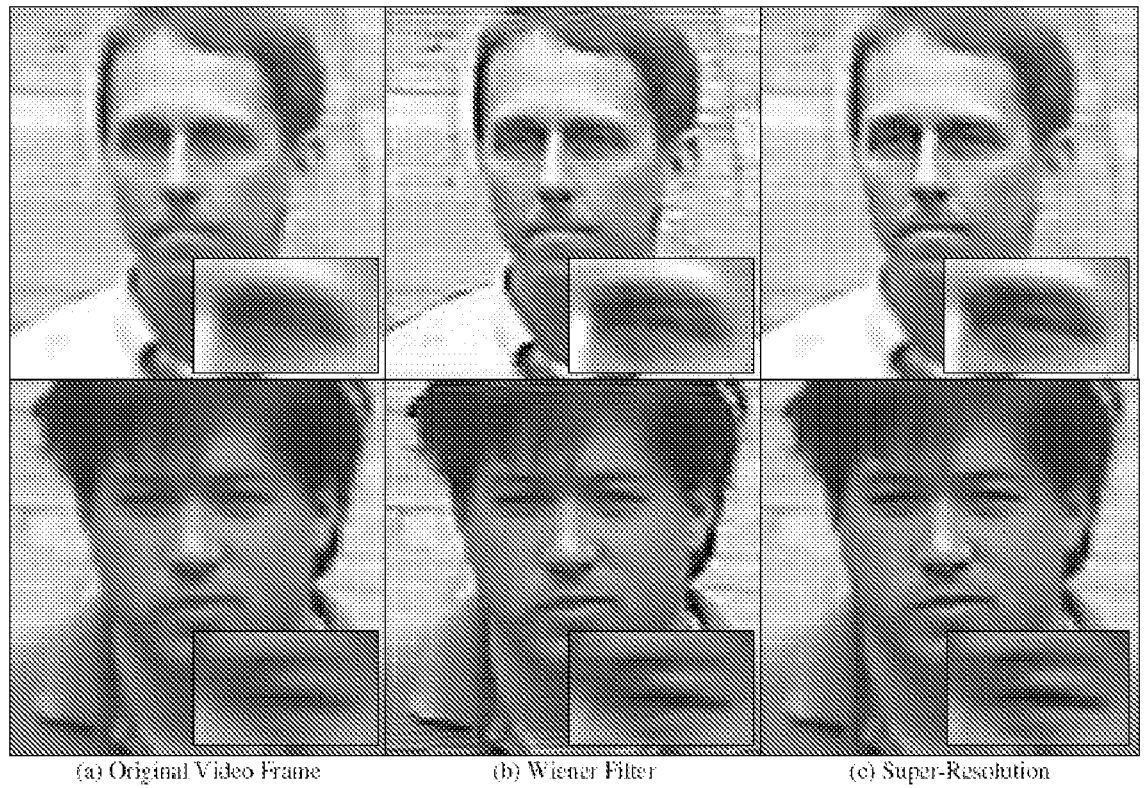
FIGS. 6(a) through 6(c) compare an original video frame against the output of a single frame through the system of FIG. 1 and the output of multiple frames through the system of FIG. 4.

Referring to FIGS. 6(a) through 6(c), there is shown a comparison of an original video frame (FIG. 6(a)) with enhanced video frames. FIG. 6(b) illustrates the results of a Wiener filter on a single video frame. FIG. 6(c) illustrates the results of super-resolution utilizing the super-resolution algorithm 124 on a plurality of consecutive video frames. It is clear that the clarity of the facial images shown in FIGS. 6(b) and 6(C) incrementally improves over FIG. 6(a).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A system for producing restored facial images from frames of a video, comprising:
    an active shape component for fitting an active shape model to a facial image found in each of a plurality of digital video frames;
    a registration component for registering each location within a facial region of each said facial image with a corresponding location in any of the other facial images; and
    a restoration component for producing a restored facial image from the facial images.

2. The system of claim 1, wherein the active shape component comprises:
    a video input module for providing a plurality of video frames;
    a face detection module adapted to detect a face in each of the plurality of video frames; and
    a fitting module for determining facial image model parameters such that the model closely resembles the face in each of the plurality of video frames.

3. The system of claim 1, wherein said restoration component comprises a super-resolution algorithm.

4. The system of claim 3, wherein the super-resolution algorithm comprises:
    an image formation model (IFM) which uses an active shape model for each of the plurality of video frames for producing IFM facial images; and
    a data fidelity model which uses actual facial images from each of the plurality of video frames to compare to the IFM facial images, said data fidelity model including a cost function.

5. The system of claim 4, comprising a regularization model for inhibiting high spatial frequency distortion, said regularization model including a second cost function.

6. The system of claim 1, wherein said restoration component comprises:
    a warping module for taking an output from the registration component to warp each of the facial images of each of the plurality of video frames to a new frame of reference having a greater pixel resolution than the pixel resolution of the plurality of video frames;
    an averaging module for averaging each of the warped facial images on a pixel by pixel basis; and
    an image restoration algorithm for producing a restored facial image from the averaged facial images.

7. The system of claim 6, wherein the image restoration algorithm comprises a Wiener filter.

8. The system of claim 6, wherein the new frame of reference has a pixel resolution two times greater than the pixel resolution of the plurality of video frames.

9. A computerized method for producing restored facial images from frames of a video, comprising:
    receiving a plurality of digital video frames containing facial images;
    fitting an active shape model to a facial image found in each of the plurality of video frames;
    registering each image location of each said facial image with the corresponding image location of each of the other facial images; and
    producing a restored facial image from the facial images that has a resolution.

10. The method of claim 9, wherein said fitting an active appearance model comprises:
    accessing a database of facial images; and
    constructing a generalized mathematical representation of the appearance and the shape of the facial images from the database.

11. The method of claim 10, wherein the generalized mathematical representation is adjustable.

12. The method of claim 9, wherein the fitting an active appearance model comprises:
    detecting a face in each of the plurality of video frames; and
    producing facial image model parameters such that the facial image model closely resembles the face in each of the plurality of video frames.

13. The method of claim 9, wherein said producing a restored facial image comprises utilizing a super-resolution algorithm.

14. The method of claim 13, wherein the super-resolution algorithm comprises:
    an image formation model (IFM) which uses an active shape model for each of the plurality of video frames for producing IFM facial images; and
    a data fidelity model which uses actual facial images from each of the plurality of video frames to compare to the IFM facial images, said data fidelity model including a cost function and a cost function gradient.

15. The method of claim 14, comprising regularizing to inhibit high spatial frequency distortion.

16. The method of claim 9, wherein said producing a restored facial image comprises:

a warping module for taking an output from the registration component to warp each of the facial images of each of the plurality of video frames to a new frame of reference having a greater pixel resolution than the pixel resolution of the plurality of video frames;

an averaging module for averaging each of the warped facial images on a pixel by pixel basis; and an image restoration algorithm for producing a restored facial image from the averaged facial images.

17. The method of claim 16, wherein the image restoration algorithm comprises a Wiener filter.

18. The method of claim 16, wherein the new frame of reference has a pixel resolution two times greater than the pixel resolution of the plurality of video frames.

* * * * *